United States Patent Office 3,786,104
Patented Jan. 15, 1974

3,786,104
ACRYLONITRILE GRAFT COPOLYMERS AND A PROCESS FOR THE PRODUCTION
Siegfried Korte, Leverkusen, and Carl Hans Süling, Odenthal-Hahnenberg, Germany, assignors to Bayer Aktiengesellschaft, Leverkusen, Germany
No Drawing. Filed June 29, 1972, Ser. No. 267,541
Claims priority, application Germany, June 29, 1971, P 21 32 171.1
Int. Cl. C08f 29/56
U.S. Cl. 260—881
5 Claims

ABSTRACT OF THE DISCLOSURE

The object of the invention are graft copolymers consisting of a copolymer of N-vinylpyrrolidone and vinylacetate as graft substrate and a copolymer of acrylonitrile and vinylbromide being compolymerized on said graft substrate. Fibres prepared from these graft copolymers show outstanding high flame stabilities. The graftcopolymers are produced by polymerizing a mixture of acrylonitrile and vinylbromide in the presence of a N-vinylpyrrolidone/vinylacetate copolymer.

---

This invention relates to acrylonitrile graft copolymers and to a process for the production of graft copolymers in which acrylonitrile and vinyl bromide are grafted on to a graft substrate of N-vinyl pyrrolidone/vinyl acetate copolymers.

It is known that polymers of the kind obtained by copolymerizing acrylonitrile with relatively large proportions of halogen-substituted monomers, which generally show favorable fireproofing or at least fire-retarding properties in addition to favorable fibre-forming properties, are suitable for use as fireproofing additives for coating agents, shaped articles such as films and fibres or for sheet products such as floor coverings or carpets.

In addition to acrylonitrile, by far the majority of these "modacrylic polymers" and "modacrylic fibres" mainly contain chlorine-containing components such as vinyl chloride and/or vinylidene chloride. However, it is known that an improvement in the resistance of fibres to fire by the incorporation of halogen compounds into the starting materials used for making these fibres, for example as achieved by copolymerizing acrylonitrile with vinyl chloride, can in many cases be obtained only at the expense of other properties of the fibre. This applies in particular to acrylonitrile copolymers of the kind in which the requisite degree of non-inflammability can be obtained only by incorporation of a relatively large proportion of the halogen-containing comonomer. In many cases, for example, fibres which consist of such polymers or which contain such polymers as additives, undergo much greater shrinkage under the effects of dry heat or hot water than fibre samples comprising 100% or substantially 100% of polyacrylonitrile. In addition, a reduction in the softening temperature of the polymer and a deterioration of its light and heat stability must be accepted in many cases.

More recently, the use of vinyl bromide as comonomer has been recommended for the production of non-inflammable polymers. It has been found that acrylonitrile/vinyl bromide copolymers were, for example, not as unstable to light and heat as had been first thought.

It is significant that a given degree of non-inflammability can be obtained in copolymers with a relatively small quantity of total incorporated halogen if components containing a mixture of chlorine and bromine rather than chlorine alone are used for copolymerization.

It is also known from German Offenlegungsschrift No. 1,595,030 that acrylonitrile:vinyl bromide copolymers with less than 50% by weight of vinyl bromide incorporated therein have a more favorable range of properties than polymers with a comparable quantity of vinyl chloride incorporated in them.

In particular, light and heat stability are said to be considerably improved for the following reasons:

In the copolymerization of acrylonitrile with vinyl chloride, molecular chains with longer sequences of vinyl chloride units are formed on account of the ratio of reactivity of these particular components. Light- and/or heat-induced dehydrochlorination which can progress along these chain sequences is thus promoted. By contrast, vinyl bromide is statistically distributed throughout the chain formed during the copolymerization, no relatively long polyvinyl bromide sequences being formed and the result of this is that acrylonitrile units in the chain have a blocking effect upon the light and heat initiated elimination of hydrogen bromide.

This "stabilization" of the polymer chains disappears with increasing incorporation of vinyl bromide so that acrylonitrile/vinyl bromide copolymers containing more than 50% by weight of vinyl bromide have hitherto not acquired any significance as fibre-forming polymers. In addition, the copolymerization of vinyl bromide with acrylonitrile becomes critical in respect of conversion and degree of polymerization if the monomer mixture to be polymerized in dominated by vinyl bromide.

The development of vinyl bromide polymers which do not have any of the disadvantage referred to above and in which vinyl bromide is incorporated in high proportions, would be an aim worth striving to attain where such materials are intended to be used as flameproofing additives for shaped articles such as filaments and fibres.

The object of the invention are graft polymers comprising from 3.5 to 30% by weight of a copolymer from 30 to 80% by weight of N-vinyl pyrrolidone and 70 to 20% by weight of vinyl acetate and—in graft—polymerized from 70 to 96.5% by weight of a monomer mixture consisting of 10 to 60% by weight of vinyl bromide and 90 to 40% by weight of acrylonitrile. The graft copolymer containing the copolymer of N-vinylpyrrolidone with vinylacetate as a graft substrate has $[\eta]$-values of from 0.35 to 3.5, measured in dimethylformamide at 20° C.

These graft polymers from vinyl bromide, acrylonitrile N-vinylpyrrolidone and vinylacetate showing improved stability despite their high content of vinyl bromide are obtained by a graft polymerization process in which mixtures of the two monomers are radically polymerized in an aqueous medium in the presence of an N-vinyl pyrrolidone/vinyl acetate copolymer. Even where these copolymers have high vinyl bromide contents p.i. more than of 50% by weight calculated on the graft polymer the vinyl bromide/acrylonitrile graft copolymers are obtained in high yields and with a satisfactory degree of polymerization. Graft copolymers with less than 50% by weight of vinyl bromide incorporated in them show increased softening points compared with corresponding acrylonitrile-vinyl bromide copolymers.

Accordingly, the invention relates to a process for the production of acrylonitrile/vinyl bromide copolymers by radically initiated polymerization, in which acrylonitrile and vinyl bromide are polymerized in an aqueous medium in the presence of an N-vinyl pyrrolidone/vinyl acetate copolymer.

Copolymers of N-vinyl pyrrolidone and vinyl acetate are used as the graft substrates. Graft substrates of this kind may be obtained by polymerizing vinyl acetate and N-vinyl pyrrolidone in an aqueous medium at temperatures of from 40° to 100° C., preferably from 60° to 80° C., in the presence of radical-forming initiators. Suitable radical-forming initiators include peroxides, aliphatic azo compounds or redox systems. Particularly good graft substrates are obtained by using aliphatic azo compounds, preferably azodiisobutyronitrile, in neutral media. The graft substrates thus produced are obtained in the form of emulsion-like mixtures which can be used for the subsequent graft copolymerization reaction without any further treatment being necessary.

Particularly favorable results are obtained with graft substrates which contain from 30 to 80% by weight, preferably from 40 to 70% by weight, of N-vinyl pyrrolidone and from 20 to 70% by weight, preferably from 30 to 60% by weight, of vinyl acetate.

The N-vinyl pyrrolidone/vinyl acetate copolymers are used as graft substrate in quantities of from 3.5 to 30% by weight, preferably from 5 to 15% by weight, based on the total quantity of the monomer mixture to be grafted thereon. The graft substrates are used in the form of aqueous emulsions with a solids content of from 10 to 70% by weight, preferably from 15 to 40% by weight.

A mixture of acrylonitrile and vinyl bromide is used as the graft monomer. The composition of such a mixture can be varied within wide limits so that polymeric products containing from 15 to 81.5% by weight of acrylonitrile and from 1.5 to 80% by weight of vinyl bromide are formed by the graft copolymerization, the sum of the percentage contents of graft substrate and incorporated monomers amounting to 100%.

Polymers with particularly advantageous properties are obtained by using monomer mixtures containing from 10 to 60% by weight of vinyl bromide and from 40 to 90% by weight of acrylonitrile.

The graft copolymerization reaction can be carried out as emulsion or dispersion copolymerization. However, it is preferably carried out by precipitation polymerization in which the monomer mixture to be polymerized is polymerized in an aqueous medium in the presence of the graft substrate and the graft copolymers formed are precipitated in finely divided form during the polymerization reaction itself. For this purpose, the entire quantity of graft substrate can be introduced initially in an aqueous emulsion and the monomer mixture introduced either continuously or in portions. It is of particular advantage, however, to introduce the graft substrate and the mixture of monomers simultaneously in portions into the reaction vessel over a limited period of time depending on the time of polymerizing.

Polymers with a particularly uniform structure are obtained in this way. The graft copolymerization reaction may be carried out in glass reaction vessels or in glasslined reaction vessels or even in stainless steel autoclaves. These reaction vessels must be equipped with facilities for stirring their contents and should allow reactions to be carried out under a slight excess of pressure.

The graft polymerization reaction is initiated by initiators which yield free radicals. Such initiators include peroxidic compounds and combinations of oxidizing agents and reducing agents, optionally in conjunction with heavy metal compounds. Organic and inorganic water-soluble peroxides are particularly suitable. Peroxides of this kind are compounds which contain a peroxide group (—O—O—) in their molecule. It is particularly preferred to use alkali or ammonium salts of peroxy disulphuric acid, hydrogen peroxide or organic hydroperoxides derived therefrom. Such compounds may be used in quantities of, for example, from 0.1 to 3.0% by weight, preferably from 0.5 to 1.0% by weight, based on the weight of the polymerizable monomer material. For activation, it is further advisable to add reducing agents which can readily be raised into higher valence states by reaction with the aforementioned peroxidic compounds. Using a redox system of this kind polymerization can be initiated at temperatures as low as about 10° C. Examples of suitable reducing agents include sulphur dioxide, alkali and ammonium bisulphites, sodium formaldehyde sulphoxylate, sulphinic acids and salts of these. The activators may be used in a concentration of from 0.1 to 3.0% by weight, based on the monomer mixture to be polymerized. It is advantageous to introduce the catalyst system, consisting of the peroxidic compound and the reducing agent, during the polymerization reaction either continuously or in portions in order to maintain a uniform catalyst concentration in the reaction mixture.

The graft copolymerization reaction is carried out with the catalysts and activators described above at temperatures of from 10° to 80° C., preferably from 25° to 70° C. It is advantageous to work in the absence of oxygen and to introduce the individual components of the polymerization system in the presence of inert gases. It has proved to be advantageous to carry out the polymerization reaction under a slight excess pressure of nitrogen (up to about 3 atms.).

The quality of the polymer is to a certain extent governed by the pH-value of the reaction medium. Favorable results are obtained in acid medium at pH-values of from 4 to 6.

In order to ensure that the polymerization proceeds smoothly without any disturbances, particularly during the initial phase of the reaction, it is of advantage to use small quantities of emulsifiers at the beginning of the grafting reaction. Ionic and/or non-ionic emulsifiers can be used.

Anionic emulsifiers such as the water-soluble alkali salts of fatty acids and long-chain aliphatic sulphonic acids, are particularly suitable. The salts of sulphonic acid semi-esters formed from long-chain alcohols may also be used in quantities of from 0.1 to 1.0% by weight, based on the weight of the monomers. It is often advantageous to introduce the emulsifiers in solution in an aqueous medium at the beginning of the polymerization reaction.

In the graft polymerization of acrylonitrile/vinyl bromide mixtures, especially those with high acrylonitrile contents, it is advisable to use polymerization regulators to prevent the formation of polymer components with excessively high molecular weights. Examples of suitable regulators include alkyl and aryl mercaptans; chlorine-containing compounds, such as carbon tetrachloride or chloroform; and primary alcohols.

The intrinsic viscosities of the acrylonitrile:vinyl bromide graft copolymers as measured on solutions in dimethyl formamide (DMF) show a tendency to decrease with increasing vinyl bromide content of the polymer. The $[\eta]$-values determined lie within a range from 0.35 to 3.5 at a temperature of 20° C.

With acrylonitrile contents of from 50 to 80% by weight, graft copolymers produced by the process described above can be processed into fibres and filaments which show high flame stabilities. The acrylonitrile/vinyl bromide graft copolymers described above are also especially suitable for use as additives to improve the subtantial non-inflammability of other acrylic and "modacrylic" polymers or fibres from said polymers.

By virtue of the outstanding compatibility of these mixtures, it is also possible to use polymers with more than 50% by weight of vinyl bromide incorporated in them.

The invention is illustrated by the following examples in which the percentages refer to weight unless otherwise stated.

EXAMPLE 1

The following solutions and mixtures are used for polymerization:

(I)

1200 g. of deionized water;
3 g. of lauryl sulphate; and
3 g. of n-sulphuric acid.

(II)

500 g. of deionized water; and
4.5 g. of potassium sulphate.

(III)

1500 g. of deionized water;
3 g. of sodium bisulphite; and
160 g. of an aqueous (19%) emulsion of a copolymer of 75% of N-vinyl pyrrolidone and 25% of vinyl acetate.

(IV)

230 g. of acrylonitrile (AN); and
340 g. of vinyl bromide (VBr).

(AN:VBr=40:60)

Solution I is initially introduced under a nitrogen atmosphere into a 6-litre-capacity autoclave equipped with a stirring mechanism. Solutions II and III and monomer mixture IV are then introduced in portions into the reaction mixture at 40° C. with a stirring speed of 150 r.p.m. so that 1/10 portions of II, III and IV are introduced into the reaction vessel under a slight excess pressure of nitrogen (approximately 3 atms.) at 30 minute intervals over a total period of 5 hours. The reaction mixture is then left to react for a further 5 hours (t=40° C.), after which a finely divided readily filterable vinyl bromide/acrylonitrile copolymer is isolated.

Yield: 465 g. (78%) $[\eta]_{DMF}$=0.78 at 20° C.
Composition: 51% of vinyl bromide, 44% of acrylonitrile and 5% of graft substrate.

The graft copolymer obtained is suitable for use as flameproofing additive for shaped plastics articles.

EXAMPLE 2

A further three polymers were prepared according to the procedure described in Example 1 except that the ratios by weight of the monomer mixture were varied. The polymer yields, vinyl bromide contents of the isolated graft polymers, and their intrinsic viscosities are set out in the following table:

|   | Monomer weight ratio AN/VBr | Yield, percent | VBr content, percent | $[\eta]$ DMF, 20° C. |
|---|---|---|---|---|
| 1 | 80/20 | 85.5 | 14.6 | 3.36 |
| 2 | 60/40 | 83.0 | 33.0 | 1.24 |
| 3 | 20/80 | 64.0 | 63.5 | 0.42 |

The intrinsic viscosities $[\eta]$ have been determined by measuring the viscosity of solutions of the polymer in dimethylformamide at 20° C. (see H. G. Elias "Makromoleküle" S. 265 to 266, Verlag Hüthig u. Wepf-Verlag, Basel and Heidelberg, 1971).

What we claim is:

1. A graft copolymer comprising from 3.5 to 30% by weight of a copolymer comprising polymerized units of from 30 to 80% by weight of N-vinyl pyrrolidone and from 70 to 20% by weight of vinyl acetate as graft substrate; and from 70 to 96.5% by weight of polymerized units of a monomer mixture of from 10 to 60% by weight of vinyl bromide and from 90 to 40% by weight of acrylonitrile, said graft copolymer having $[\eta]$-values of from 0.35 to 3.5, measured in dimethyl formamide at 20° C.

2. The graft copolymer of claim 1, wherein the monomer weight ratio between acrylonitrile and vinylbromide is in the range of 80/20 to 20/80.

3. The graft copolymer of claim 1, wherein the amount of the graft substrate is 5 to 15% by weight based on the amount of the acrylonitrile/vinylbromide mixture to be grafted thereon.

4. A process for the production of the graft copolymer of claim 1 which comprises polymerizing a monomer mixture consisting of acrylonitrile and vinyl bromide in an aqueous medium in the presence of an N-vinyl pyrrolidone/vinyl acetate copolymer and of 0.1 to 3.0% by weight based on the weight of the polymerizable monomers of a radical-forming initiator, said polymerizing being effected at temperatures of between 40 to 80° C. and at a pH-value of between 4 to 7.

5. The process of claim 4, wherein said radical-forming initiator is a redox initiator consisting of a peroxide compound and a sulphur compound.

References Cited

UNITED STATES PATENTS 3,231,536  1/1966  Voeks _____ 260—29.6

FOREIGN PATENTS 1,090,580  1967  Great Britain.
819,049  1959  Great Britain.

MURRAY TILLMAN, Primary Examiner

C. J. SECCURO, Assistant Examiner

U.S. Cl. X.R.

260—23 XA, 876 R, DIG 24